April 16, 1935. R. C. PIERCE Re. 19,537

TANK CAR

Original Filed Jan. 8, 1931 5 Sheets-Sheet 1

Inventor:
Raymond C. Pierce,
By Dyrenforth, Lee, Christon & Wiles,
Attys.

April 16, 1935. R. C. PIERCE Re. 19,537
TANK CAR
Original Filed Jan. 8, 1931 5 Sheets-Sheet 2
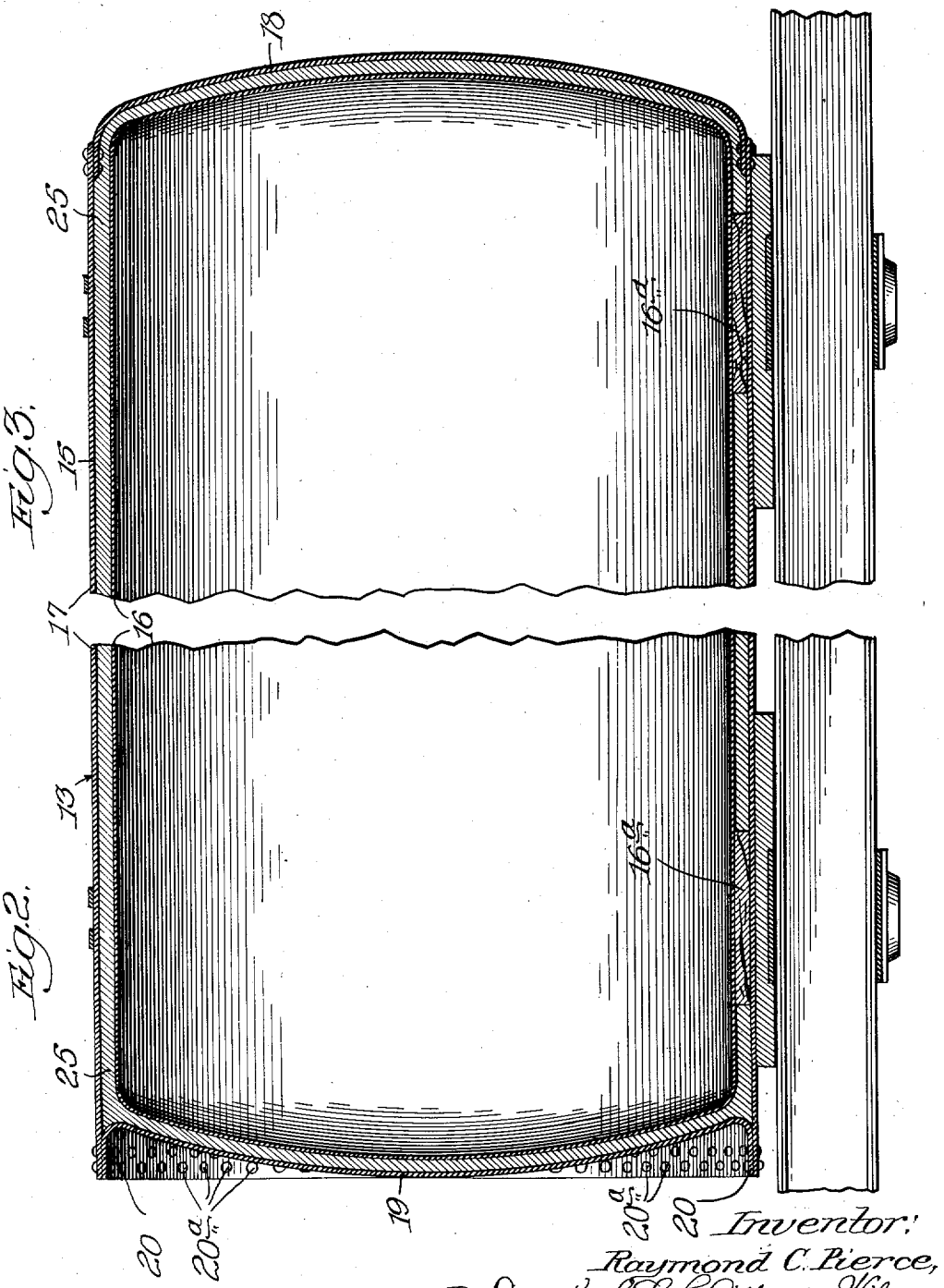

April 16, 1935. R. C. PIERCE Re. 19,537

TANK CAR

Original Filed Jan. 8, 1931 5 Sheets-Sheet 3

Inventor:
Raymond C. Pierce,
By Dyrenforth, Lee, Chritton & Wiles,
Attys.

April 16, 1935. R. C. PIERCE Re. 19,537

TANK CAR

Original Filed Jan. 8, 1931 5 Sheets-Sheet 4

Inventor:
Raymond C. Pierce,
By Dyrenforth, Lee, Christon & Wiles,
Attys.

April 16, 1935. R. C. PIERCE Re. 19,537

TANK CAR

Original Filed Jan. 8, 1931 5 Sheets-Sheet 5

Inventor:
Raymond C. Pierce,
By Dyrenforth, Lee, Chritton & Wiles,
Attys.

Reissued Apr. 16, 1935

Re. 19,537

UNITED STATES PATENT OFFICE 19,537

TANK CAR

Raymond J. Pierce, Chicago, Ill., assignor to General American Tank Car Corporation, Chicago, Ill., a corporation of West Virginia Original No. 1,988,808, dated January 22, 1935, Serial No. 507,488, January 8, 1931. Application for reissue February 20, 1935, Serial No. 7,393

8 Claims. (Cl. 220—9)

My invention relates, more particularly, to improvements in tank cars for the transporting of ladings of such character that contacting of the same with steel is undesirable, as for example because of the chemical action of the ladings on the steel or the deleterious action of the steel on the ladings.

Tanks for such ladings and having linings have been used in some instances but have presented difficulties due particularly to the contracting and expanding of the tanks.

My primary object is to provide a tank car wherein the lading will not contact with the steel portion of the tank but with an inner container portion of such material that objectionable action of the lading and the metal of the container one on the other will be avoided, which may be manufactured relatively economically, will be highly suited for its intended purpose, and the contracting and expanding of which will not set up undesirable stresses in the inner container portion.

Referring to the accompanying drawings:

Figure 2 is a view in longitudinal sectional elevation of one end of the tank car.

Figure 3 is a similar view of the other end of the tank car.

Figure 6:
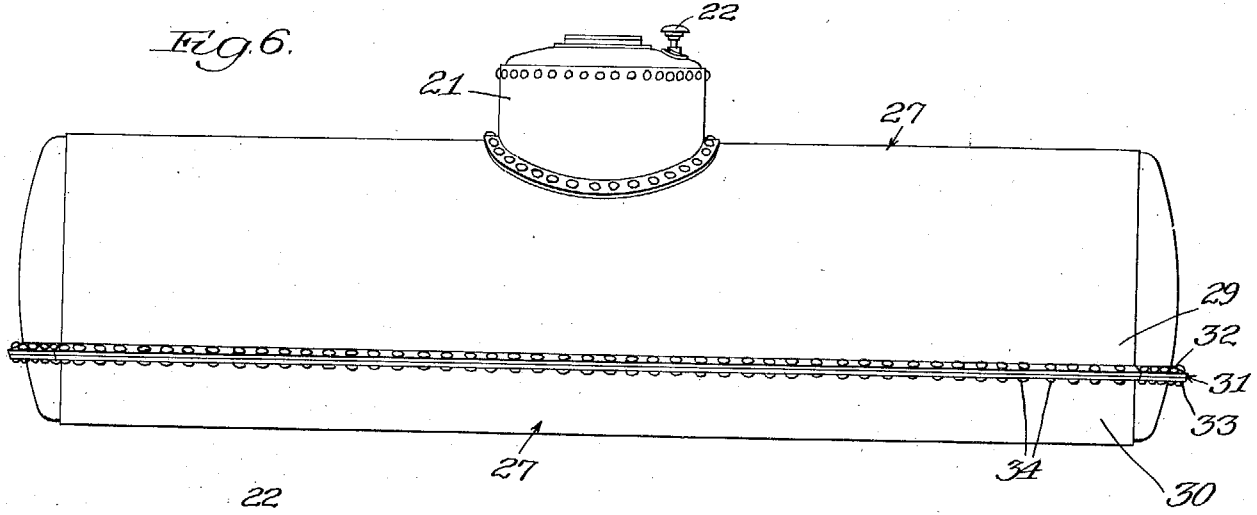
Figure 6 is a view in side elevation of a modification of the tank portion of the car and constituting another embodiment of my invention.
Figure 8:
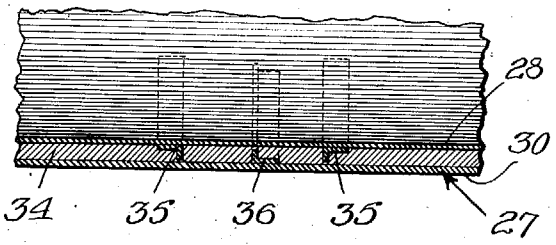
Figure 7:
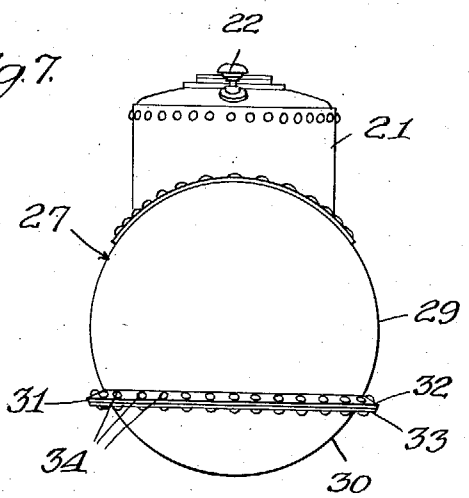
Figure 7 is an end view of the tank of Fig. 6.

Figure 8, an enlarged broken view in longitudinal sectional elevation of the lower portion of the tank of Figs. 6 and 7.

Referring to the construction shown in Figs. 1–5, inclusive, 9 represents the underframe of the car which may be of any desirable construction, that shown being of the common center still type comprising, generally stated, a center sill 10, suitably supported at its ends on bolsters 11 which, in turn, are supported on trucks in accordance with common practice the wheels of which are represented at 12.

The car also comprises a cylindrical tank structure represented at 13 supported on its side on the bolsters 11 and extending lengthwise of the underframe, with seating blocks 14 shown as interposed between these parts; the tank structure being held on the underframe by any suitable means as are commonly provided for preventing or restricting relative longitudinal movement of the tank structure and the underframe.

The tank structure comprises an outer tank 15 and an inner tank 16. The outer tank or shell 15, which is constructed of steel to meet the standards required for the tanks of tank cars as commonly provided, comprises a main cylindrical portion 17, a head 18 at one end of the portion 17 in accordance with common practice and a head 19 at the other end of the portion 17 set into the latter and formed with an outwardly extending continuous peripheral flange 20 at which it is riveted, as represented at 20a, to the side portion 17, the tank 15 having a dome portion 21 provided with a vent 22 in accordance with common practice.

The inner shell 16, which is constructed of relatively thin gage metal of such kind as will not be affected by the lading and will not affect the latter, the sections forming the body portion of this shell being preferably welded together, is of cylindrical form with its ends closed and provided with a dome-portion 23 having a vent-trap 23a, the shell 16 being of smaller size than the tank 15 and preferably formed with corrugated portions 24 as represented.

The shell 16 is spaced throughout its extent from the tank 15, and filling the space therebetween is filler and anchoring material 25 of any desirable kind as for example, and by preference, asphalt or cement mixed with heat-insulating material such as asbestos fiber.

The shell 16 is preferably provided at opposite sides of its center with pairs of arcuate angle irons 26 extending into the space between the tank 15 and shell 16 at the bottom of the tank structure.

Figure 1:
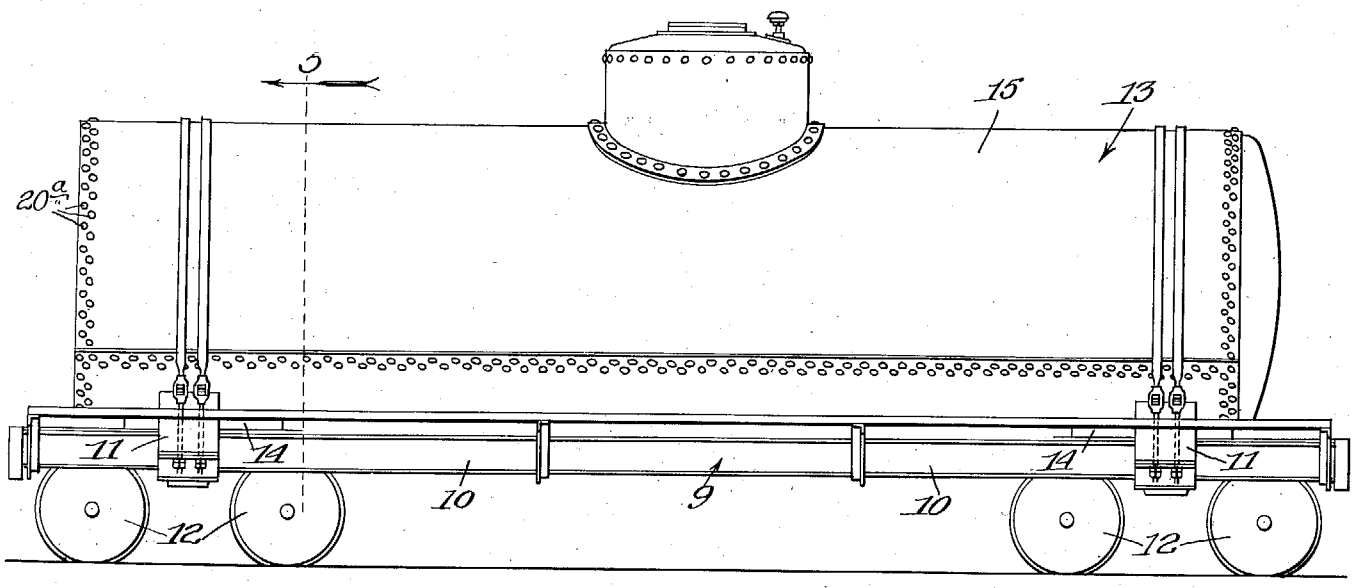
Figure 1 is a view in side elevation of a tank car embodying my invention.
Figure 4:
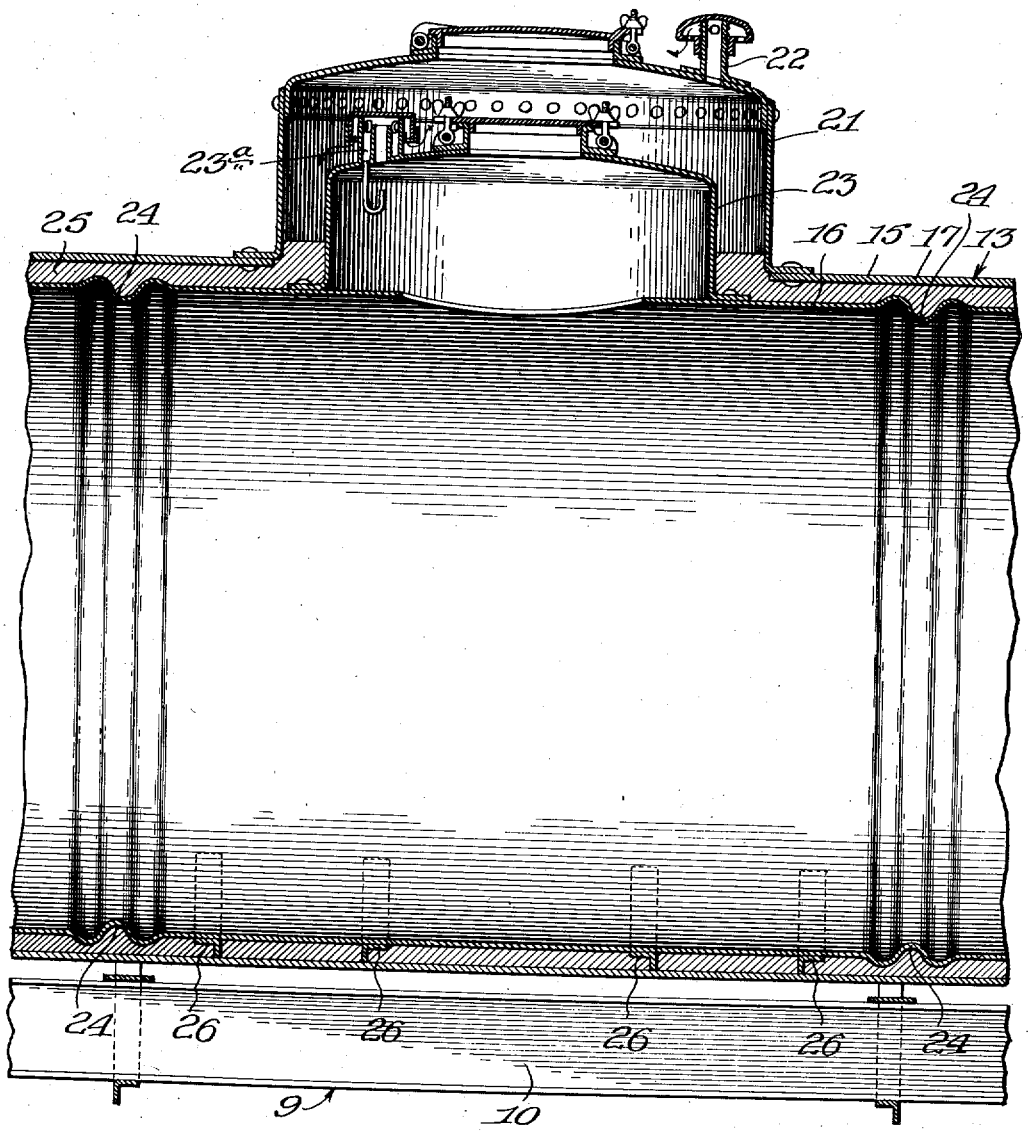
Figure 4 is a similar view of the central portion of the tank car.
Figure 5:
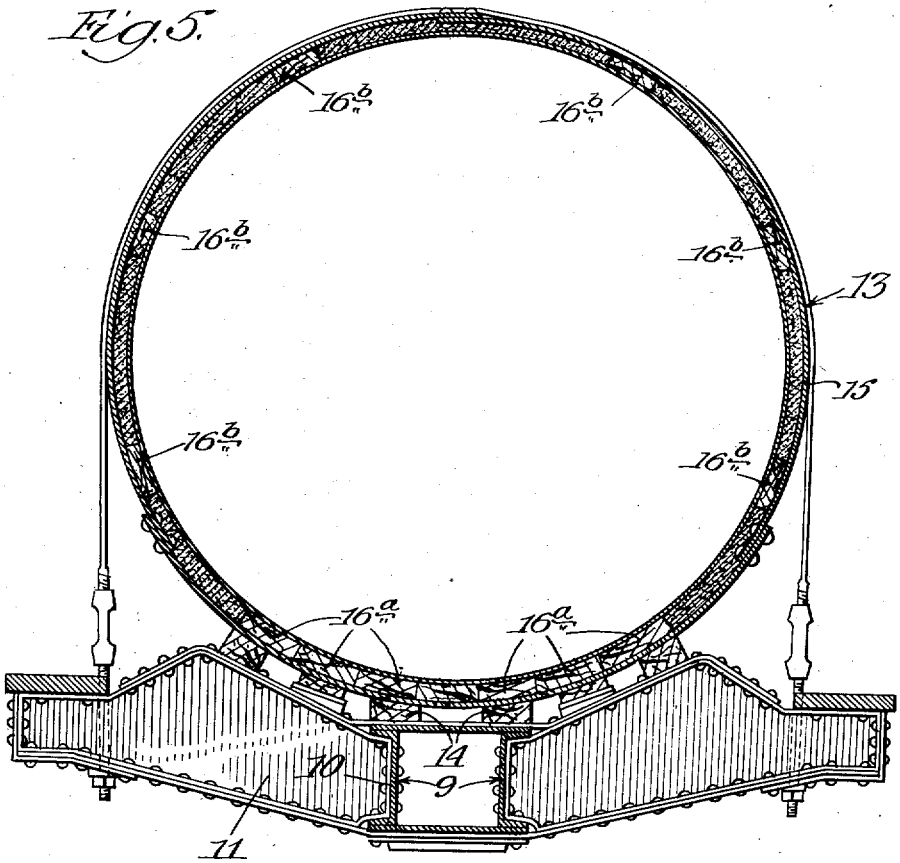
Figure 5 is an enlarged section taken at the line 5 on Fig. 1 and viewed in the direction of the arrow.

In the manufacture of the tank structure, the shell 16, minus its dome 23, is introduced endwise into the left-hand end of the tank 15 in Figs. 1 and 2, the head 19 being unassembled with the cylindrical portion 17, and slid completely into the tank in the spaced relation thereto shown in Figs. 2, 3 and 4, on filler blocks 16a previously positioned on the bottom of the tank 15. The head 19 is then secured in place on the cylinder portion 17, and the domes 21 and 23 applied to, and secured in, the positions shown in Fig. 4, the dome 23 being applied first.

The space between the tank 15 and shell 16 is then filled with the material 25 up to substantially the level shown in Fig. 4, the shell 16 having been previously filled with hot water or steam to heat it when the material 25 is of such nature, as for example asphalt, that it is required to be heated for rendering it in a condition for introduction into the space referred to and the hot water or steam as the case may be being then removed, the material 25 becoming set.

It will be understood from the foregoing that the shell 16 is embedded in the filler-material 25 and thus the contracting of the tank-structure will not subject the inner shell to objectionable stresses.

Furthermore, the filler-material 25 serves as a means for anchoring the shell 16 and also in the example of material above set forth serves as means for insulating the inner shell from the atmosphere, the provision of the projections 26 being desirable as they operate in conjunction with the filler material 25 to augment the anchoring of the inner shell.

The inner shell is preferably provided with the corrugations 24 as thereby anchorage of the inner shell is still further augmented and expansion of this shell compensated for.

Filler blocks represented at 16[b] are preferably positioned between the tank and shell to ensure the proper positioning of the inner shell during the time that the filler material is in fluid condition.

Referring to the construction shown in Figs. 6, 7 and 8, wherein the invention is embodied in a tank car of desirable construction where the tank need not be pressure tight, it comprises an outer cylindrical tank 27 and an inner cylindrical shell 28 supported in spaced relation in the tank 27 as in the case of the construction of the preceding figures.

The tank 27 is formed of two main body sections 29 and 30 extending the full length of the tank structure with the joint 31 between these sections extending lengthwise of the structure, the sections 29 and 30 being provided at the joint 31 with continuous outwardly projecting flanges 32 and 33, respectively, at which these sections are secured together, as by the rivets represented at 34.

The inner shell may be of the same form and construction as the shell 16 of the preceding figures, but the dome of which (not shown) may be welded, if desired, instead of riveted, to the body portion of shell 28.

In this construction the parts of the tank structure are assembled by lowering the inner shell into the lower section 30 of the outer tank, spacer blocks (not shown) being provided in this section to form supports for the inner shell, these blocks being of such thickness that in the final assembled position of the tank and shell the inner shell will be spaced throughout its extent from the outer tank.

The section 29 is then lowered onto the lower section 30 and these sections secured together by the rivets 34.

The space between the tank and shell is then filled with any suitable filler material represented at 34 as explained in connection with the construction of the preceding figures, the inner shell thus becoming embedded in the material 34.

The shell 28 by preference is provided with pairs of projections 35 preferably at opposite sides of its center as explained of the preceding figures and preferably the outer tank is provided on its inner surface with similar inwardly extending projections, one for each pair of projections 35, and one of which is shown at 36, the projections 36 being located between the projections 35 of each pair thereof and in spaced relation thereto, as shown of the one projection 36, the projections 35 and 36 thus becoming embedded in the filler material 34.

It will be understood that, if desired, the tank 15 of Figs. 1–5 may be provided with projections corresponding with the projections 36 in which case the tank 15 and shell 16 would be provided of such diameters that the inner shell may be inclined, with respect to the outer tank, at such an angle as to permit the projections 35 to clear the projections 36 in the insertion of the shell 16 endwise into the tank 15.

While I have illustrated and described certain particular embodiments of my invention, I do not wish to be understood as intending to limit it thereto as the same may be variously modified and altered and the invention embodied in other forms of structure without departing from the spirit of my invention.

What I claim as new, and desire to secure by Letters Patent, is:

1. A tank-car structure comprising an outer tank, a shell located in said tank in spaced relation thereto, a projection on the outer surface of said shell extending crosswise thereof and initially plastic filler material located between said tank and shell and into which said projection extends, said projection being movable with said shell against the filler material.

2. A tank-car structure comprising an outer tank, a shell located in said tank in spaced relation thereto, spaced apart projections on the outer surface of said shell and extending crosswise thereof and initially plastic filler material located between said tank and shell and into which said projections extend, said projections being movable with said shell against the filler material.

3. A tank-car structure comprising an outer tank, a shell located in said tank in spaced relation thereto, a projection on the outer surface of said shell extending crosswise thereof and settable filler material located between said tank and shell and into which said projection extends, said projection being movable with said shell against the filler material.

4. A tank-car structure comprising an outer tank, a shell located in said tank in spaced relation thereto, a projection on the outer surface of said shell extending crosswise thereof, a projection on the inner surface of said tank and extending crosswise thereof and opposing said first-referred-to projection in spaced relation thereto, and filler material located between said tank and shell and between said projections and into which said projections extend, the projection on said shell being movable therewith against the filler material.

5. A tank-car structure comprising an outer tank, a second tank located in said first-referred-to tank in spaced relation thereto, projections on the outer surface of said second tank and the inner surface of said outer tank and extending crosswise of said tanks, one of said tanks having two of said projections spaced apart and the other of said projections extending between said spaced-apart projections and out of contact therewith, and filler material located between said tanks and between said projections and into which said projections extend, the projections on said second tank being movable therewith against the filler material.

6. The method of assembling the inner and outer dome equipped tanks of a double-tank structure which consists in introducing the inner tank, without its dome, endwise into the outer tank open at one end, and thereafter closing the open end of the outer tank and inserting the dome for the inner tank through the dome of the outer tank and securing it in position on the inner tank.

7. The method of assembling the inner and outer dome equipped tanks of a double-tank structure which consists in introducing the inner tank, without its dome, endwise into the outer tank open at one end, to become positioned in the outer tank with its side wall in spaced relation to the surrounding side wall of the outer tank, and thereafter closing the open end of the outer tank and inserting the dome for the inner tank through the dome of the outer tank and securing it in position on the inner tank.

8. The method of assembling the inner and outer dome equipped tanks of a double-tank structure which consists in introducing the inner tank, without its dome, endwise into the outer tank open at one end, to become positioned in the outer tank in spaced relation thereto, closing the open end of the outer tank, inserting the dome for the inner tank through the dome of the outer tank, and securing it in position on the inner tank, and filling the space between said tanks with a settable filler material.

RAYMOND C. PIERCE.